United States Patent [19]

Carr et al.

[11] Patent Number: 4,534,833

[45] Date of Patent: Aug. 13, 1985

[54] ZINC-CHLORIDE BATTERY IN A CHLORINE PRODUCING/CONSUMING PLANT

[75] Inventors: Peter Carr, Utica, Mich.; John W. Rowan, Stamford, Conn.

[73] Assignee: Energy Development Associates, Inc., Greensboro, N.C.

[21] Appl. No.: 579,290

[22] Filed: Feb. 14, 1984

Related U.S. Application Data

[63] Continuation of Ser. No. 374,395, Mar. 5, 1982, abandoned.

[51] Int. Cl.³ .......................... C25B 1/00; H01M 8/18
[52] U.S. Cl. ..................................... 204/128; 429/17; 429/21; 429/27; 429/34; 429/50; 429/51; 204/DIG. 4
[58] Field of Search ...................... 429/17, 21, 27, 29, 429/34, 50, 51; 204/DIG. 4, 128

[56] References Cited

U.S. PATENT DOCUMENTS

| | | | |
|---|---|---|---|
| 3,180,813 | 4/1965 | Wasp et al. | 204/DIG. 4 |
| 3,713,888 | 1/1973 | Symons . | |
| 3,813,301 | 5/1974 | Carr . | |
| 3,993,502 | 11/1976 | Bjorkman | 429/21 |
| 4,071,660 | 1/1978 | Hart . | |
| 4,087,976 | 5/1978 | Morrow et al. | 429/17 |
| 4,100,332 | 7/1978 | Carr . | |
| 4,105,829 | 8/1978 | Venero | 429/29 |
| 4,124,741 | 11/1978 | Hart . | |
| 4,127,701 | 11/1978 | Symons et al. . | |
| 4,279,712 | 7/1981 | Satoh et al. | 204/128 |
| 4,287,267 | 9/1981 | Whittlesey et al. . | |
| 4,290,873 | 9/1981 | Weaver | 204/128 X |
| 4,294,815 | 10/1981 | Lohrberg | 204/128 X |
| 4,397,730 | 8/1983 | Bindra | 429/29 X |

OTHER PUBLICATIONS

Publication #8412-0513-2/79/0779-142, entitled "The Zinc-Chlorine Battery in the Best Facility": 1981, Copyright 1979 American Chemical Society, reprinted from Proceedings of the 14th Intersociety Energy Conversion Engineering Conference.

Energy Development Associates' Brochure entitled, "EDA Creative Energy Storage Systems".
Society of Automotive Engineers, Inc., reprint #789362, entitled "100 MWh Zinc-Chlorine Peak-Shaving Battery Plants", by Charles J. Warde et al, Energy Development Associates, reprinted Sep. 1978, from The 13th Intersociety Energy Conversion Engineering Conference.

Primary Examiner—Brian E. Hearn
Assistant Examiner—Stephen J. Kalafut
Attorney, Agent, or Firm—Harness, Dickey & Pierce

[57] ABSTRACT

An improved chlorine producing plant having at least one electrolytic cell adapted to generate chlorine in combination with a zinc-chloride battery stack and electrolyte circulation system is disclosed. Conduit means is provided for permitting the chlorine generated by the battery stack during the charging of the battery stack to supplement the amount of chlorine generated by the electrolytic cell, and for permitting the electrolytic cell to supply chlorine to the battery stack during the discharge of the battery stack. Additionally, power conditioning means may be interposed between the electrolytic cell and the zinc-chloride battery stack for permitting the zinc-chloride battery stack to supplement the supply of electrical power to the electrolytic cell during the discharging of the battery stack. In operation, the zinc-chloride battery stack is charged substantially during off-peak electrical energy consuming hours and discharged substantially during on-peak electrical energy consuming hours. The principals of the present invention are also applicable to chlorine consuming plants having a means for conveying chlorine from a source of chlorine, such as a tank car containing liquified chlorine. A zinc-chloride battery stack is provided in combination with conduit means for permitting the chlorine generated by the battery stack during the charging of the battery stack to supplement the amount of chlorine to the chlorine consuming plant, and for permitting the conveying means to supply chlorine to the battery stack during the discharging of the battery stack.

33 Claims, 4 Drawing Figures

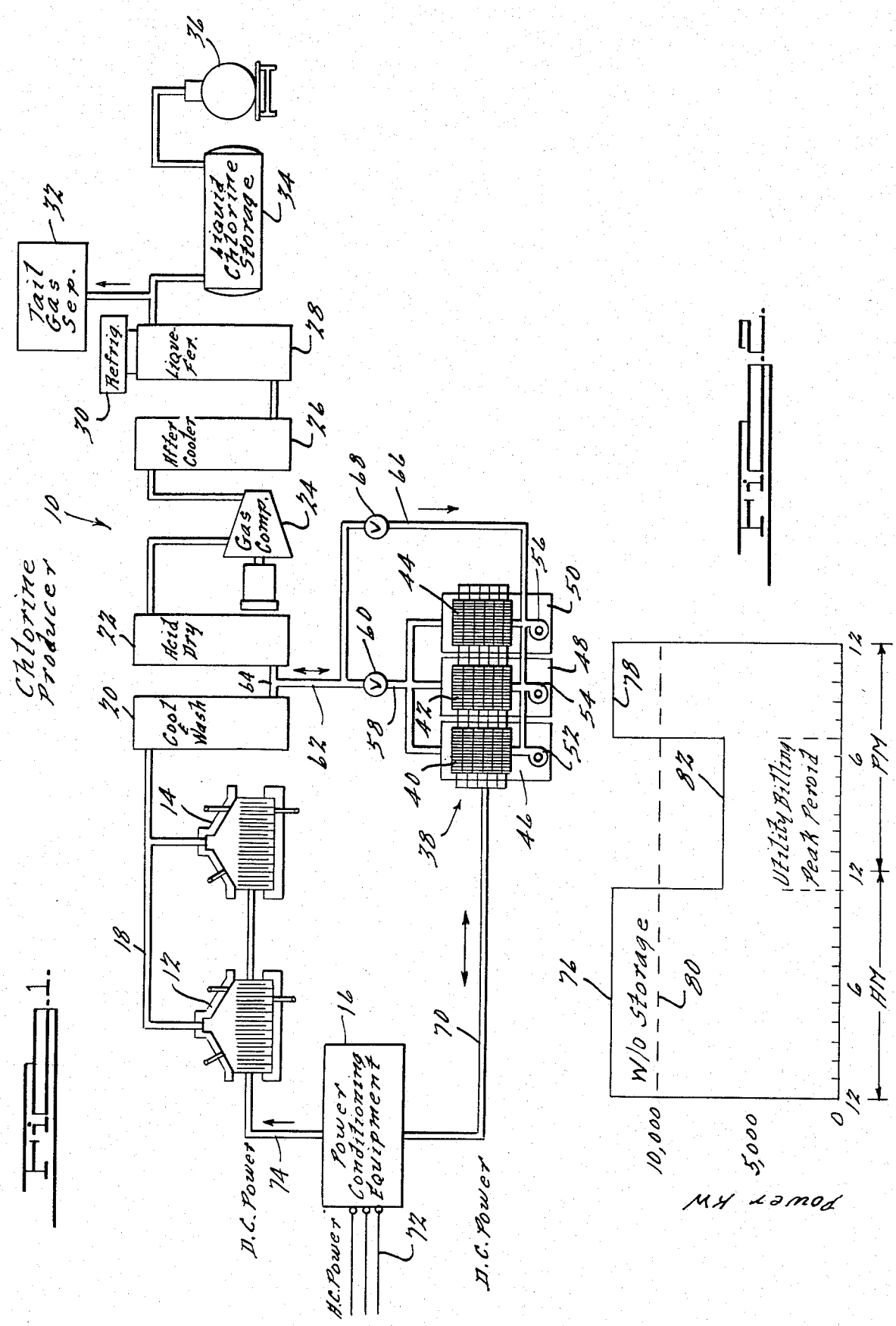

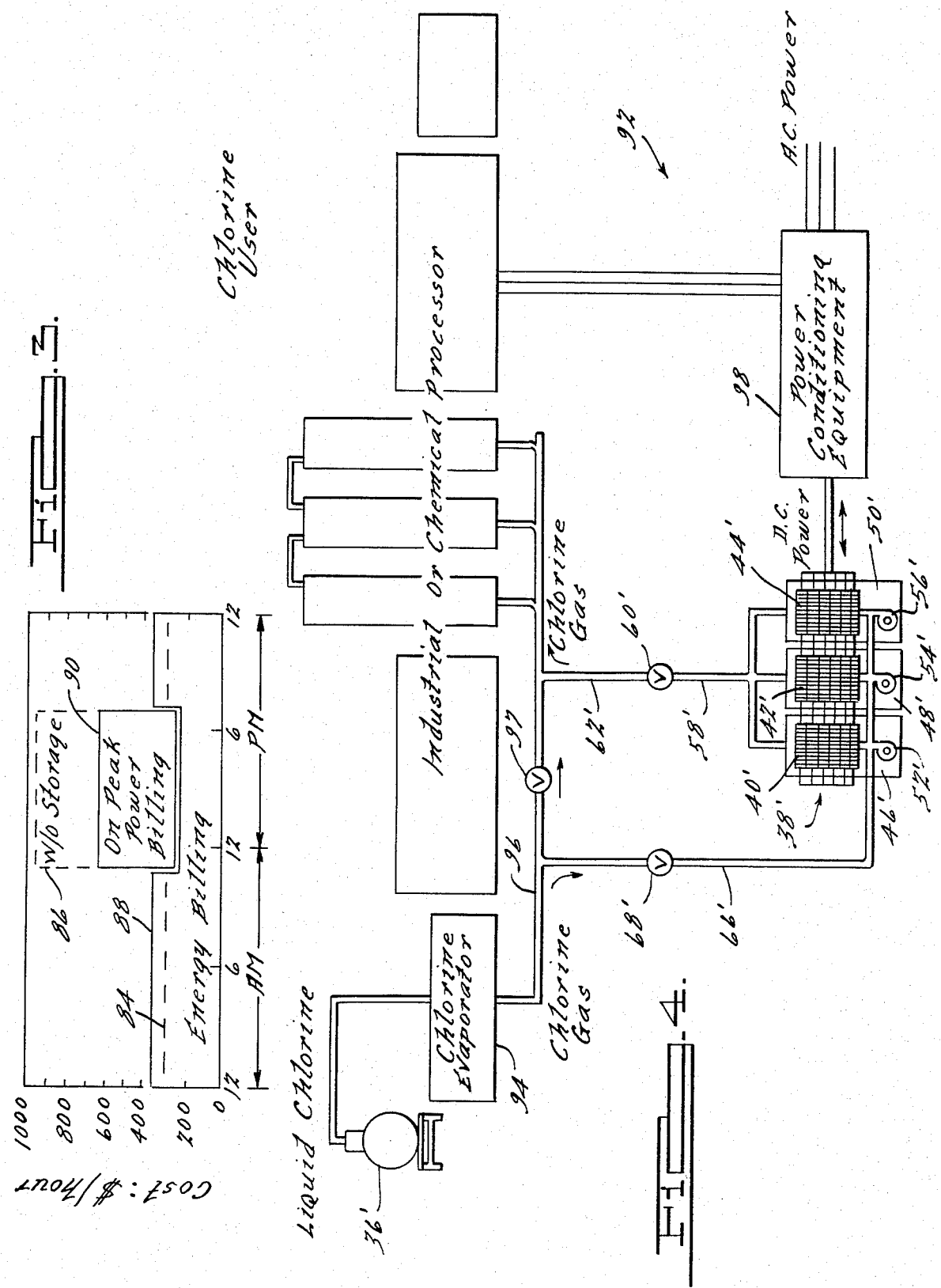

ZINC-CHLORIDE BATTERY IN A CHLORINE PRODUCING/CONSUMING PLANT

This application is a continuation of application Ser. No. 374,395, filed May 3, 1982, now abandoned.

BACKGROUND OF THE INVENTION

The present invention relates generally to zinc-chlorine battery systems and chlorine producing/consuming plants. More particularly the invention relates to an advantageous combination to zinc-chlorine battery stack and a chlorine producing or consuming plant.

Due to the increasing demand for electricity and the decreasing availability (and increasing cost) of distillate oil and natural gas, the need has arisen for an alternate method of supplying peak demand electricity. Presently, the electricity generated for peak demand is supplied from diesel engines and combustion turbines, which are fired by distillate oil and natural gas. One such method is the use of secondary energy storage batteries to store electricity generated from utility base-load facilities during the night or off-peak hours, and discharging these batteries during the hours of peak demand. Secondary energy storage batteries which could be considered for this application include lead-acid, lithium-iron sulfide, sodium sulfur, and zinc-chloride batteries.

The use of secondary energy storage batteries in the above application generally requires a scale up of a basic battery design to form a battery plant capable of delivering electrical energy on the order of several mega-watt hours in a single discharge. One such battery plant design is disclosed in the Whittlesey et al U.S. Pat. No. 4,287,267, issued on Sept. 1, 1981, entitled "Zinc-Chlorine Battery Plant System And Method". This battery system is also described in published reports prepared by the assignee herein, such as "Development of Zinc-Chloride Battery for Utility Applications," Interim Report EM-1417, May 1980, and "Development of the Zinc-Chloride Battery for Utility Applications," Interim Report EM-1051, April, 1979, both prepared for the Electric Power Research Institute, Palo Alto, Calif. The specific teaching of the aforementioned cited references are incorporated herein by reference.

Although electric utilities will comprise the principal users of "peak-shaving" or "load-leveling" battery plants for service in the sub-transmission network of the utilities, it may be economically advantageous for industrial customers of the electric utilities to also employ battery plants. Due at least in part to the operating and maintenance costs associated with the peak demand generating engines, the electric utilities typically charge a premium or place a surcharge on the electricity supplied to their industrial customers over the peak period. This surcharge is substantial and can amount to several times the normal kilo-watt hour rate charged by the utilities for off-peak electrical energy consumption. Accordingly, industries which consume large amounts of electrical energy may achieve significant savings by employing one or more battery plants to supply or supplement the electricity required during on-peak electrical energy consuming hours.

One industry which is known to require large amounts of electrical power is the "chlor-alkali" industry. This industry refers to the manufacture of chlorine and alkali caustic from electrolytic cells which generate chlorine gas, hydrogen gas and caustic soda from a steady supply of brine electrolytic solution. Banks of these cells are employed in a typical manufacturing plant, and since each cell normally consumes between ten to thirty thousand amperes, the electrical power required to operate a chlor-alkali plant is substantial.

The use of secondary energy storage batteries in the chlor-alkali industry has previously been considered to obtain a more favorable rate structure from the supplying electric utility by permitting the industry to be classified as a disruptable power consuming industry. However, efforts to employ lead-acid batteries for this purpose have not proven to be economically viable. However, the zinc-chloride battery system could also be considered for this purpose since its life-cycle projected cost is more favorable than that for lead-acid batteries. Additionally, the zinc-chloride battery system could be employed in conjunction with the chlor-alkali industry in a "peak shaving" capacity as well.

Accordingly, it is a principal object of the present invention to provide a unique combination of a chlorine producing plant and a portion of the zinc-chloride battery system to yield a low cost energy storage system for the chlor-alkali industry or other chlorine producing industries.

It is a more specific object of the present invention to provide a chlor-alkali plant which combines at least one electrolytic cell and the battery stack and electrolyte circulation subsystems of the zinc-chloride battery system to permit an advantageous transfer of the gas products generated by the electrolytic cell and the zinc-chloride battery stack.

It is an additional object of the present invention to provide a chlor-alkali plant which combines at least one electrolytic cell and the battery stack and electrolyte circulation subsystems of the zinc-chloride battery system to permit the battery stack to supplement the supply of electrical power to the electrolytic cell during the discharging of the battery stack.

It is another principal object of the persent invention to provide a novel combination of a chlorine consuming plant and a portion of the zinc-chloride battery system to yield a low cost energy storage system for chlorine consuming industries.

Additional advantages and features of the present invention will become apparent from a reading of the detailed description of the preferred embodiments which makes reference to the following set of drawings in which:

BRIEF DESCRIPTION OF THE DRAWING

FIG. 1 is a simplified schematic diagram of a chlorine producing facility employing a combination of electrolytic cells and zinc-chloride battery stacks according to the present invention.

FIG. 2 is a graph comparing the electrical power required over a twenty-four hour period by a chlorine producing plant which does employ energy storage and a chlorine producing plant which does not employ energy storage.

FIG. 3 is a graph comparing the cost of the electrical power consumed over a twenty-four hour period for a chlorine producing plant which does employ energy storage and a chlorine producing plant which does not employ energy storage.

FIG. 4 is a simplified schematic diagram of a chlorine using facility employing zinc-chloride battery stacks according to the present invention.

SUMMARY OF THE INVENTION

In its broader aspects the present invention concerns an approved gas producing plant having at least one electrolytic cell adapted to generate the gas in combination with at least one secondary energy storage cell capable of generating the gas during a first cycle portion and consuming the gas during a second cycle portion. Suitable conduit means is provided for permitting the secondary energy storage cell to supplement the amount of the gas generated by the electrolytic cell during the first cycle portion, and for permitting the electrolytic cell to supply the gas to the secondary energy storage cell during the second cycle portion. More particularly, with respect to the chlor-alkali industry, the present invention concerns an improved chlorine producing plant having at least one electrolytic cell adapted to generate chlorine in combination with a zinc-chloride battery stack. Similarly, conduit means is provided for permitting the chlorine generated by the battery stack during the charging of the battery stack to supplement the amount of chlorine generated by the electrolytic cell, and for permitting the electrolytic cell to supply chlorine to the battery stack during the discharge of the battery stack. Additionally, power conditioning means may be interposed between the electrolytic cell and the zinc-chloride battery stack for permitting the zinc-chloride battery stack to supplement the supply of electrical power to the eletrolytic cell during the discharging of the battery stack. In operation, the zinc-chloride battery stack is charged substantially during off-peak electrical energy consuming hours and discharged substantially during on-peak electrical energy consuming hours. The principals of the present invention are also applicable to chlorine consuming plants having a means for conveying chlorine from a source of chlorine, such as a tank car containing liquified chlorine. A zinc-chloride battery stack is provided in combination with conduit means for permitting the chlorine generated by the battery stack during the charging of the battery stack to supplement the amount of chlorine to the chlorine consuming plant, and for permitting the conveying means to supply chlorine to the battery stack during the discharging of the battery stack.

DESCRIPTION OF THE PREFERRED EMBODIMENTS

Referring to FIG. 1, a simplified schematic diagram of a chlorine producing plant 10 according to the present invention is shown. The chlorine producing plant 10 includes a plurality of electrolytic cells 12 and 14 which are adapted to generate chlorine gas from a steady supply of brine solution. The electrolytic cells 12 and 14 may be comprised of diaphragm, mecury or other conventional electrolytic cells of this type. For example, in the operation of a typical diaphragm cell, sodium or potassium chloride brine is fed into the anode compartment and flows through a cell diaphragm into the cathode compartment where alkali is formed. Chlorine gas is formed at the anode and hydrogen and alkali (caustic soda) are formed at the cathode of the cell. A more detailed discussion of the construction in operation of chlorine producing electrolytic cells may be found in *Chlorine, Its Manufacture, Properties And Uses*, Robert E. Krieger Publishing Company, Huntington, N.Y. 1972, which is hereby incorporated by reference.

Since chlorine producing electrolytic cells operate from d.c. electrical power, the plant 10 includes suitable power conditioning equipment 16 for converting the a.c. electrical power supplied by the electric utility to the appropriate d.c. electrical power level required by the electrolytic cells. A chlorine collection manifold 18 is connected to the chlorine gas outlets at the top of the electrolytic cells 12 and 14 to collect the chlorine gas generated by the cells. The chlorine producing plant 10 also includes conventional chlorine processing means which receives the chlorine gas from the chlorine collection manifold 18 and prepares it for storage or shipment. The chlorine gas from the chlorine collection manifold 18 is cooled by direct contact with water in a packed tower 20, and then dried with sulfuric acid in tower 22. In order to liquify the chlorine gas, a gas compressor 24 is provided to increase the pressure (to typically 25 and 100 psi), and then the temperature of the chlorine gas is decreased by cooling units 26, 28 and 30. Any foreign gases which are present with the chlorine gas are subsequently vented and processed through a tail gas separater 32. The chlorine is then properly conditioned for storage in a storage tank 34 and subsequent shipment, such as by tank car 36.

In accordance with the present invention, two subsystems 38 of the normally self contained zinc-chloride battery system are provided in the chlorine producing plant 10 to permit an advantageous transfer of the chlorine gas generated by the electrolytic cells 12 and 14 with the zinc-chloride battery subsystems. The zinc-chloride battery subsystems 38 provided are the battery stack and electrolyte circulation subsystems. Three battery stacks 40, 42 and 44, are provided, each of which comprises a plurality of the zinc-chloride cells which are connected electrically in the appropriate series and parallel combinations to permit electrical current to flow through the battery stacks. Each of the zinc-chloride cells comprises a positive electrode and a negative electrode in contact with an aqueous zinc-chloride electrolyte. The means for circulating the electrolyte through the battery stacks 40–44 comprises a sump or reservoir 46–50 containing a supply of electrolyte for each of the battery stacks respectively, and an electrolyte pump 54–56 for each of these respective battery stacks.

During the charging portion of the battery cycle, d.c. electrical power is supplied to the battery stacks 40–44 from the power conditioning equipment 16 at the appropriate voltage level necessary to cause electrolysis of the zinc-chloride electrolyte. In order to maintain a sufficient supply of reactants in the cells, the electrolyte pumps 52–56 operate to circulate the electrolyte contained in the reservoirs 46–50 through the battery stacks. The electrolysis within the cells causes chlorine gas to be liberated or generated at the positive electrodes and zinc metal to be deposited upon the negative electrodes.

During the discharging portion of the battery cycle, the electrolysis reaction is reversed such that chlorine is consumed at the positive electrodes and the zinc metal is dissolved off the negative electrodes.

From the foregoing discussion it is apparent that during the charging of the battery stacks 40–44 some means must be provided to contain or store the chlorine gas. Similarly, during the discharging of the battery stacks 40–44 some means must be provided to return the chlorine gas generated on charge to the battery stacks. In the state of the art self contained zinc-chloride battery systems this is accomplished by providing a hydrate store subsystem which operates during charge to mix the chlorine gas with a chilled liquid to form a solid substance analogous to ice, referred to as chlorine hydrate. Then, on discharge the chlorine hydrate is melted in order to recover the chlorine gas and pump it back to the battery stack. A more detailed discussion of these self contained zinc-chloride battery systems may be found in the following cited references owned by the same assignee as the present invention: Symons U.S. Pat. No. 3,713,888 entitled "Process For Electrical Energy Using Solid Halogen Hydrates"; Symons U.S. Pat. No. 3,809,578 entitled "Process for Forming and Storing Halogen Hydrate in a Battery", which are hereby incorporated by reference, as well as in the previously cited references.

Although self contained zinc-chloride battery systems have many advantages and benefits in comparison with other energy storage systems, the applicants have found that the hydrate store subsystem is not required when the battery stack and electrolyte circulation subsystem are combined with electrolytic cells in a chlorine producing or consuming plant according to the present invention. This combination achieves a significant reduction in both the complexity and cost of the system without significantly affecting the operation of the chlorine production in the plant.

This unique combination is achieved by providing for conduit means which permits the chlorine gas generated by the battery stacks 40-44 during charge to supplement the amount of chlorine gas generated by the electrolytic cells 12 and 14, and which permits the electrolytic cells to supply chlorine gas to the battery stacks during discharge. Thus, the need for chlorine storage is eliminated since the battery stacks 40-44 operated effectively as another electrolytic cell during charge, and the electrolytic cells 12 and 14 serve as a source of chlorine for the battery stacks during discharge.

The battery stacks 40-44 are provided with a chlorine transferring manifold 58, which is adapted to collect the chlorine gas generated by the battery stacks during charge. A valve 60 is provided for controlling the flow of chlorine gas through the manifold 58 to a chlorine transferring conduit 62. One end of the conduit 62 is connected to a chlorine conveying conduit 64 which is interposed between the towers 20 and 22. During charge, the valve 60 is opened to permit the chlorine gas generated by the battery stacks 40-44 to flow to the chlorine processing means (via the manifold 58 and conduits 62 and 64) and combine with the chlorine gas generated by the electrolytic cells 12 and 14.

A chlorine transferring conduit 66 is provided to permit a portion of the chlorine gas generated by the electrolytic cells 12 and 14 to supply chlorine to the battery stacks 40-44 during the discharging of the battery stacks. The chlorine gas generated by the electrolytic cells 12 and 14 passes through the transferring conduits 62 and 66 to the circulating means of each of the battery stacks, where it is combined with the electrolyte being circulated through the battery stacks via electrolyte pumps 52-56. A suitable valve 68 is provided to control the flow of chlorine gas through the transferring conduit 66 to the battery stacks 40-44. Accordingly, it will be appreciated that the valve 66 will be closed and the valve 60 will be open during the charging of the battery stacks, and the valve 60 will be closed and the valve 66 will be open during discharge.

It should be noted that the conduit means connecting the battery stack 40-44 with the electrolytic cells 12 and 14 may be suitably varied without departing from the spirit and scope of the present invention. For example, the transferring conduit 62 may be directly connected to the chlorine collecting manifold 18 of the electrolytic cells, or the transferring conduit 62 may be connected at other stages in the chlorine processing means, such as to the liquid chlorine storage tank 34. Thus, it should be understood that the chlorine being supplied to the battery stacks 40-44 during discharge may be in either a gaseous or liquid state. Additionally, the valves 60 and 66 may not be required in the appropriate configuration, thereby permitting the direction of the chlorine gas transfer between the battery stacks 40-44 and the electrolytic cells 12 and 14 to be dependent upon only the differences in gas pressure at each end of the conduit means. It should also be appreciated that it may be desirable to provide one or more gas pumps or orifices in the conduit means to more fully control the transfer of chlorine between the electrolytic cells 12 and 14 and the battery stacks 40-44.

The electrical energy stored in the battery stacks 40-44 may be utilized during discharge in at least three ways according to the present invention. During the discharging of the battery stacks 40-44, the power conditioning equipment 16 operates to place a resistive load accross the battery stacks in order to permit the battery stacks to supply or supplement electrical power to the load. One way in which the electrical energy stored in the battery stacks may be utilized is to provide the electric utility grid network itself as the load across the battery stacks. In this situation the power conditioning equipment 16 will operate to convert the d.c. electrical power transmitted from the battery stacks 40-44 along power lines 70 to the a.c. power level compatible with the utility power lines 72. This will allow battery stacks 40-44 to function in a "peak shaving" or "load leveling" capacity. Another way for the stored electrical energy to be utilized is to provide the electrolytic cells 12 and 14 as the load for the battery stacks 40-44. In this situation, the power conditioning equipment will operate as an electrical interface between the battery stacks 40-44 and the electrolytic cells 12 and 14 to enable the battery stacks to supplement d.c. electrical power to the electrolytic cells in combination with the electrical power supplied by the electrical utility. A third way in which the stored electrical energy may be utilized will arise when the electric utility deems it necessary to interrupt the power supplied to the plant 10. In this situation, the power conditioning equipment 16 will operate to permit the battery stacks 40-44 to provide all the electrical power necessary to operate the electrolytic cells 12 and 14, as well as any essential auxiliary equipment in the plant. The power conditioning equipment 16 may be generally comprised of one or more thyristor converter bridges for converting a.c. electrical power to d.c. electrical power and d.c. electrical power to a.c. electrical power as required, power factor correction capacitors, a harmonic filter, and the appropriate switch gear to permit electrical power transfer from the battery stacks to the electrolytic cells.

Referring to FIGS. 2 and 3, a preferred method of operating the chlorine producing plant 10 according to the present invention will now be described.

FIG. 2 is a graph comparing the electrical power required over a twenty-four hour period by the chlorine producing plant 10 and a chlorine producing plant which does not employ energy storage. Without employing energy storage, the energy consumption of a chlorine producing plant will typically be constant due to the characteristics of the electrolytic cells. Generally speaking, electrolytic cells of this type are normally operated at a constant power consumption rate, i.e., the rate corresponding to the most efficient operating condition for the cells. However, when a secondary energy storage battery system according to the present invention is employed in a chlorine producing plant, it is preferred that the battery system be charged substantially during off-peak electrical energy consuming hours and discharged substantially during on-peak electrical energy consuming hours. The typical hours of peak demand for the normal electric utility generally extend from 11:00 a.m. to 7:00 p.m., as illustrated in FIG. 2. Taking the chlorine producing plant 10 as an example, the curved portions 76 and 78 of FIG. 2 indicate that the electrical power consumed by the plant will increase when the battery stacks 40–44 are charged during the off-peak hours, in comparison with the normal power consumption rate indicated by the broken line 80. However, in the situation where the battery stacks 40–44 are used to supplement the supply of electrical power to the electrolytic cells 12 and 14 during discharge, the curved portion 82 indicates that the power consumption rate will decrease below the normal power consumption rate for the plant.

FIG. 3 graphically depicts the advantageous result achieved by operating the chlorine producing plant 10 in accordance with the method described above. FIG. 3 is a graph comparing the cost of the electrical power consumed over a twenty four hour period for the chlorine producing plant 10 and a chlorine producing plant which does not employ an energy storage system according to the present invention. The broken line 84 represents the normal costs associated with the electrical power consumption during off-peak hours, while the broken line 86 represents the cost associated with electrical power consumption during on-peak hours. When the battery stacks 40–44 are charged during the off-peak hours, the curved portion 88 indicates that the cost will increase due to the increased power consumption for the plant. However, when the battery stacks 40–44 are discharged during the on-peak hours, the curved portion 90 indicates that the cost for buying electricity will substantially decrease in comparison with the normal cost associated over that time period. It should be noted that no secondary energy storage battery is 100% efficient. Accordingly, a portion of the energy consumed by the plant 10 during the charging of the battery stack 40–44 will not be recovered during discharge. However, it is believed that the magnitude of the savings achieved by employing a secondary energy storage system according to the present invention will be considerably more than the cost of purchasing and maintaining the energy storage equipment itself and the cost resulting from the loss of energy over the battery cycle. Additionally, the use of energy storage as discussed above will also provide a reliable alternative source of power for the chlorine producing plant.

When the valves 60 and 68 are employed in the chlorine producing plant 10, the operating method described above will also include the steps of controlling the valves to permit the chlorine gas generated during the charging of the battery stacks 40–44 to supplement the amount of chlorine gas generated by the electrolytic cells 12 and 14, and controlling the valves to permit the electrolytic cells to supply chlorine to the battery stacks during the discharging of the battery stacks. Thus, during charge the valve 60 will be enabled or opened, while the valve 68 will be closed. Similarly, during discharge the valve 68 will be enabled or opened, while the valve 60 will be disabled or closed. Additionally, it should be noted that the electrolyte pumps 52–56 may be disabled from circulating electrolyte or turned off when the battery stacks 40–44 are in a standby condition, generally anytime other than charge or discharge. With the electrolyte pumps 52–56 turned off, the electrolyte reactants in the battery cells will quickly become depleted, and thereby limit the extent of self discharge possible in the battery stacks. In such a state, the battery stacks 40–44 may stand idle for extended periods of time with only minimal losses of the energy stored during charge.

With respect to the effect that the battery stacks 40–44 have on the overall production of the plant 10, it should be noted that the production of hydrogen gas and caustic soda from the electrolytic cells 12 and 14 will be unaffected. Hydrogen gas and caustic soda will be generated at the normal constant rate for the electrolytic cells 12 and 14 during both the charge and discharging of the battery stacks 40–44. However, the production of chlorine gas will vary for a twenty-four hour period as the battery stacks 40–44 are charged and discharged. Nevertheless, the total chlorine production for the plant 10 for a twenty-four hour period will remain the same whether or not the battery stacks 40–44 are charged and discharged. If the "y" access of FIG. 2 is assumed to represent the magnitude of chlorine production for the plant 10, then the amount of chlorine produced when the battery stacks 44—44 are charged and discharged will generally follow the curved portions 76, 78, and 82, in comparison with the amount of chlorine produced without energy storage as represented by the broken line 80. Since, as in self contained zinc-chloride battery systems, the amount of chlorine gas generated during the charging of the battery stacks will be the same amount of chlorine required during the discharging of the battery stacks, the plant 10 will generally not experience any net loss or gain in chlorine produced over a battery cycle. It may also be noted that over a battery cycle negligible amounts of hydrogen and carbon dioxide gases are typically liberated from the battery stacks. However, these or other foreign gases from the battery stacks will not affect the plant 10, as they will be removed via the plant's tail gas separater 32.

Referring to FIG. 4, a simplified schematic diagram of a chlorine consuming plant 92 accroding to the present invention is shown. For simplicity, those components of the chlorine consuming plant 92 which are similar to like components of the chlorine producing plant 10 will be identified with the same reference numerals primed. The chlorine consuming plant 92 may comprise any industrial or chemical processor requiring the use of chlorine. For example, a chlorine consuming plant 10 may comprise a water processing plant which utilizes substantial amounts of chlorine to purify the water for subsequent internal consumption by the public. It should also be noted that water processing plants may require significant amounts of electrical energy to pump the water from a reservoir, river or other water basin to remote consumers.

The source of chlorine for the chlorine consuming plant 92 is a chlorine liquid containing tank car 36'. A suitable evaporator 94 is provided to permit the liquid chlorine to return to a gaseous state, and a conveying conduit 96 is provided to facilitate the transfer of chlorine gas from the evaporator 94 to the industrial or chemical processing equipment. As in the case of the chlorine producing plant 10, the chlorine consuming plant 92 is provided with zincchloride battery subsystems 38' and suitable conduit means for permitting the chlorine generated by the battery stacks 40'–44' during charge to supplement the amount of chlorine to the chlorine consuming plant 92, and for permitting the conveying conduit 96 to supply chlorine to the battery stacks during discharge. As illustrative of one suitable modification to the conduit means, the transferring conduit 66' is not connected to the transferring conduit 62', but rather directly connected to the conveying conduit 96. A suitable valve 97 may also be provided in the conveying conduit 96 between the transferring conduits 62' and 66'.

The chlorine consuming plant 92 is also provided with power conditioning equipment 98 which may differ from the power conditioning equipment 16 of the chlorine producing plant 10 in that the chlorine consuming plant 92 will require a.c. electrical power rather than d.c. electrical power. However, the power producing equipment 98 will operate to utilize the electrical energy stored in the battery stacks 40'–44' in a similar manner as discussed above for the chlorine producing plant 10. Accordingly, it will be appreciated then the energy storage operating aspects of the chlorine consuming plant 92 will be similar to those for the chlorine producing plant 10 described above. It should also be noted that as in the case of the chlorine producing plant 10, the chlorine consuming plant 92 will generally experience no net loss or gain over a battery cycle. Thus, the chlorine consuming plant 92 will purchase the same amount of chlorine whether or not the battery stacks 40'–44' are charged and discharged.

It should be noted that the principals of the present invention are not limited by the particular battery stack design or electrolyte circulation system employed. For example, suitable battery stack designs may be found in the following cited references owned by the same assignee as the present invention: Carr U.S. Pat. No. 4,100,332 entitled "Comb Type Bipolar Electrode Elements and Battery Stacks Thereof"; Carr U.S. Pat. No. 3,813,301 entitled "Process of Charging and Discharging a Metal Halogen Cell"; and Hart U.S. Pat. No. 4,071,660. These references are hereby incorporated by reference. Additionally, a detailed discussion of suitable electrolyte circulation subsystems may be found in one or more of the previously cited references.

In its broader aspects, the principals of the present invention are applicable to secondary energy storage cells which operate with a changing electrolyte concentration and are capable of generating a gas during a first cycle portion and consuming the gas during a second cycle portion. Such a secondary energy storage cell may be combined with an electrolytic cell adapted to generate this gas in a gas producing plant in accordance with the present invention. In this situation the gas producing plant would include conduit means, in association with the electrolytic cell and the secondary energy storage cell, for permitting the secondary energy storage cell to supplement the amount of the gas generated by the electrolytic cell during the first cycle portion (charge), and for permitting the electrolytic cell to supply the gas to the secondary energy storage cell during the second cycle portion (discharge). An example of such a secondary energy storage cell or system would be a hydrogen/chlorine electrochemical energy storage system, such as described in the Hart U.S. Pat. No. 4,124,741 entitled "Hydrogen/Chlorine Electrical Chemical Energy Storage System", which is hereby incorporated by reference.

The various embodiments which have been set forth above were for the purpose of illustration and were not intended to limit the invention. It will be appreciated by those skilled in the art that various changes and modifications may be made to these embodiments described in this specification without departing from the spirit and scope of the invention as defined by the appended claims.

What is claimed is:

1. An electrochemical system comprising:

gas producing means having at least one electrolytic cell for generating gas and having outlet means for removing said gas from said system;

secondary energy storage cell in contact with an electrolyte for generating said gas during a charging cycle and for consuming a portion of said gas during a discharging cycle;

conduit means cooperating with said gas producing means and said secondary energy storage cell for permitting said secondary energy storage cell during said charging cycle to supplement the amount of said gas generated by said gas producing means, and for permitting said gas producing means to supply said gas to said secondary energy storage cell during said discharging cycle;

power conditioning means electrically coupled to said secondary energy storage cell and also receptive of electrical energy from a source other than said secondary energy storage cell, said conditioning means providing electrical energy for energizing said gas producing means and also providing electrical energy to said secondary energy storage cell during said charging cycle, and further receiving electrical energy from said secondary energy storage cell during said discharging cycle.

2. The invention according to claim 1, wherein said first cycle portion comprises the charging of said secondary energy storage cell, and said second cycle portion comprises the discharging of said secondary energy storage cell.

3. The invention according to claim 2, wherein said secondary energy storage cell is charged substantially during off-peak electrical energy consuming hours and discharged substantially during on-peak electrical energy consuming hours.

4. The invention according to claim 3, wherein a plurality of said secondary energy storage cells are provided to form a secondary energy storage battery stack.

5. The invention according to claim 4, wherein said electrolyte is an aqueous electrolyte containing dissolved ions of said gas.

6. The invention according to claim 5, wherein said gas comprises of halogen gas.

7. The invention according to claim 6, wherein said conduit means includes valve means for controlling the flow of said halogen gas through said conduit means.

8. An electrochemical system comprising:

chlorine producing means having at least one electrolytic cell for generating chlorine and having outlet means for removing chlorine from said system;

at least one zinc-chloride cell having a positive electrode and a negative electrode contacted by an aqueous zinc-chloride electrolyte, said cell having a charging cycle which generates chlorine and a discharging cycle which consumes chlorine;

means for circulating said electrolyte through said cell;

conduit means communicating with said zinc-chloride cell and with said electrolytic cell for permitting the chlorine gas generated by said zinc-chloride cell during the charging cycle to supplement the amount of chlorine generated by said electrolytic cell, and for permitting said electrolytic cell to supply chlorine to said zinc-chloride cell during the discharging cycle; and power conditioning means electrically coupled to said zinc-chloride cell and also receptive of alternating electrical current, said conditioning means being capable of energizing said chlorine producing means and also capable of providing direct electrical current to said zinc-chloride cell during said charging cycle and of receiving direct electrical current from said zinc-chloride cell during said discharging cycle.

9. The invention according to claim 8, wherein said electrolytic cell supplies chlorine in a gaseous state to said zinc-chloride cell during the discharging of said zinc chloride cell.

10. The invention according to claim 9, wherein said conduit means includes valve means for controlling the flow of chlorine gas through said conduit means.

11. The invention according to claim 10, wherein said zinc-chloride cell is charged substantially during off-peak electrical energy consuming hours and discharged substantially during on-peak electrical energy consuming hours.

12. An electrochemical system comprising:

chlorine producing means having at least one electrolytic cell adapted to generate chlorine and having outlet means for removing chlorine from said system;

a plurality of zinc-chloride cells forming a battery stack, each of said cells having a positive electrode and a negative electrode contacted by an aqueous zinc-chloride electrolyte, said battery stack having a charging cycle which generates chlorine and a discharging cycle which consumes chlorine;

means for circulating said electrolyte through said battery stack;

conduit means communicating with said battery stack and with said electrolytic cell for permitting the chlorine generated by said battery stack during the charging cycle to supplement the amount of chlorine produced by said electrolytic cell, and for permitting said electrolytic cell to supply chlorine to said battery stack during the discharging cycle; and power conditioning means electrically coupled to said battery stack and also receptive of alternating electrical current, said conditioning means being capable of continuously energizing said chlorine producing means and also capable of providing direct electrical current to said battery stack during said charging cycle and of receiving direct electrical current from said battery stack during said discharging cycle.

13. The invention according to claim 12, wherein said electrolytic cell supplies chlorine in a gaseous state to said zinc-chloride battery stack during the discharging of said battery stack.

14. The invention according to claim 13, wherein said circulating means includes a reservoir containing a supply of said zinc-chloride electrolyte and pump means for pumping said zinc-chloride electrolyte and said reservoir to said cells in said battery stack during the charging and discharging of said battery stack.

15. The invention according to claim 14, wherein said pump means also operates to pump the chlorine gas supplied by said electrolytic cell to said zinc-chloride cells during the discharging of said battery stack.

16. The invention according to claim 15, wherein said conduit means includes valve means for controlling the flow of chlorine gas through said conduit means.

17. The invention according to claim 16, wherein said chlorine producing plant includes chlorine processing means connected to the chlorine collection manifold of said electrolytic cell for pumping and liquifying the chlorine gas, and one end of said conduit means is connected to said chlorine processing means.

18. The invention according to claim 17, wherein said zinc-chloride battery stack is charged substantially during off-peak electrical energy consuming hours and discharged substantially during on-peak electrical energy consuming hours.

19. In a chlorine consuming plant having means for conveying chlorine from a source of chlorine, the improvement comprising:

a plurality of zinc-chloride cells forming a battery stack, each of said cells having a positive electrode and a negative electrode contacted by an aqueous zinc-chloride electrolyte;

means for circulating said electrolyte through the battery stack;

conduit means communicating with said zinc-chloride battery stack and said conveying means for permitting the chlorine generated by said battery stack during the charging of said battery stack to supplement the amount of chlorine to said chlorine consuming plant, and for permitting said conveying means to supply chlorine to said battery stack during the discharging of said battery stack;

power conditioning means electrically coupled to said battery stack and also receptive of electrical energy from a source other than said battery stack, said conditioning means providing electrical energy to said battery stack during the charging thereof and further receiving electrical energy from said battery stack during discharging thereof for use in said plant.

20. The invention according to claim 19, wherein said conveying means supplies chlorine in a gaseous state to said zinc-chloride battery stack during the discharging of said battery stack.

21. The invention according to claim 20, wherein said circulating means includes a reservoir containing a supply of said zinc-chloride electrolyte and pump means for pumping said zinc-chloride electrolyte from said reservoir to said cells in said battery stack during the charging and discharging of said battery stack.

22. The invention according to claim 21, wherein said pump means also operates to pump the chlorine gas supplied by said conveying means to said zinc-chloride cells during the discharging of said battery stack.

23. The invention according to claim 22, wherein said conduit means includes valve means for controlling the flow of chlorine gas through said conduit means.

24. The invention according to claim 23, wherein said zinc-chloride battery stack is charged substantially during off-peak electrical energy consuming hours and discharged substantially during on-peak electrical energy consuming hours.

25. A method of operating a chlorine gas producing plant having at least one electrolytic cell adapted to generate chlorine gas, a zinc-chloride battery stack, means for circulating a zinc-chloride electrolyte through said battery stack, and controlled conduit means for permitting chlorine transfer between said electrolytic cell and said battery stack, comprising the steps of:
(a) providing d.c. electrical power and a supply of brine to said electrolytic cell sufficient for said electrolytic cell to generate chlorine gas;
(b) charging said battery stack substantially during off-peak electrical energy consuming hours;
(c) enabling said controlled conduit means to permit the chlorine gas generated during the charging of said battery stack to supplement the amount of chlorine gas generated by said electrolytic cell;
(d) discharging said battery stack substantially during on-peak electrical energy consuming hours;
(e) enabling said controlled conduit means to permit said electrolytic cell to supply chlorine to said battery stack during the discharging of said battery stack.

26. The method according to claim 25, including the step of disabling said circulating means when said battery stack is in a standby condition.

27. A method of operating a chlorine gas producing plant having at least one electrolytic cell adapted to generate chlorine gas, a zinc-chloride battery stack, means for circulating a zinc-chloride electrolyte through said battery stack, power conditioning means for providing d.c. electrical power to said battery stack and said electrolytic cell, and controlled conduit means for permitting chlorine transfer between said electrolytic cell and said battery stack, comprising the steps of:
(a) providing d.c. electrical power and a supply of brine to said electrolytic cell sufficient for said electrolytic cell to generate chlorine gas;
(b) charging said battery stack substantially during off-peak electrical energy consuming hours;
(c) enabling said controlled conduit means to permit the chlorine gas generated during the charging of said battery stack to supplement the amount of chlorine gas generated by said electrolytic cell;
(d) discharging said battery stack substantially during on-peak electrical energy consuming hours;
(e) enabling said controlled conduit means to permit said electrolytic cell to supply chlorine to said battery stack during the discharging of said battery stack;
(f) enabling said power conditioning means to permit said battery stack to supplement the supply of d.c. electrical power to said electrolytic cell during the discharging of said battery stack.

28. The method according to claim 27, including the step of disabling said circulating means when said battery stack is in a standby condition.

29. A method of operating a chlorine consuming plant having means for conveying chlorine from a source of chlorine, a zinc-chloride battery stack, means for circulating a zinc-chloride electrolyte through said battery stack, and controlled conduit means for permitting chlorine transfer between said conveying means and said battery stacks, comprising the steps of:
(a) charging said battery stack substantially during off-peak electrical energy consuming hours;
(b) enabling said controlled conduit means to permit the chlorine gas generated during the charging of said battery stack to supplement the amount of chlorine conveyed to said chlorine consuming plant;
(c) discharging said battery stack substantially during on-peak electrical energy consuming hours;
(d) enabling said controlled conduit means to permit said conveying means to supply chlorine to said battery stack during the discharging of said battery stack.

30. The method according to claim 29, including the step of disabling said circulating means when said battery stack is in a standby condition.

31. An electrochemical system comprising:
a source of chlorine;
a chlorine consuming plant receptive of chlorine from said source;
a plurality of zinc-chloride cells forming a battery stack, each of said cells having a positive electrode and a negative electrode contacted by an aqueous zinc-chloride electrolyte, said battery stack having a charging cycle which generates chloride and a discharging cycle which consumes chlorine;
means for circulating said electrolyte through said battery stack;
conduit means communicating with said battery stack and with said chlorine consuming plant for permitting the chlorine generated by said battery stack during the charging cycle to supplement the amount of chlorine available for consumption by said plant and for permitting said source of chlorine to supply chlorine to said battery stack during the discharging cycle; and
power conditioning means electrically coupled to said battery stack and also receptive of electrical current from a source other than said battery stack, said conditioning means providing electrical energy for energizing said plant and also providing electrical energy to said battery stack during said charging cycle, and further receiving electrical energy from said battery stack during said discharging cycle.

32. The electrochemical system according to claim 31 wherein the amount of chlorine consumed by said cells during said discharging cycle is substantially equal to the amount of chlorine generated by said cells during a subsequent charging cycle.

33. The electrochemical system according to claim 1 wherein the amount of chlorine consumed by said cell during said discharging cycle is substantially equal to the amount of chlorine generated by said cell during a subsequent charging cycle.

* * * * *